(12) United States Patent
Fan et al.

(10) Patent No.: US 9,876,696 B2
(45) Date of Patent: Jan. 23, 2018

(54) METHOD AND SYSTEM FOR PROCESSING BROWSER CRASH INFORMATION

(71) Applicant: BEIJING QIHOO TECHNOLOGY COMPANY LIMITED, Xicheng District, Beijing (CN)

(72) Inventors: Jiapeng Fan, Beijing (CN); Pengyi Zhang, Beijing (CN); Huan Ren, Beijing (CN)

(73) Assignee: BEIJING QIHOO TECHNOLOGY COMPANY LIMITED, Beijing (CN)

(*) Notice: Subject to any disclaimer, the term of this patent is extended or adjusted under 35 U.S.C. 154(b) by 261 days.

(21) Appl. No.: 14/759,617

(22) PCT Filed: Jan. 6, 2014

(86) PCT No.: PCT/CN2014/070185
§ 371 (c)(1),
(2) Date: Jul. 7, 2015

(87) PCT Pub. No.: WO2014/106489
PCT Pub. Date: Jul. 10, 2014

(65) Prior Publication Data
US 2015/0350045 A1    Dec. 3, 2015

(30) Foreign Application Priority Data
Jan. 7, 2013   (CN) .......................... 2013 1 0004497

(51) Int. Cl.
*G06F 15/16* (2006.01)
*H04L 12/26* (2006.01)
(Continued)

(52) U.S. Cl.
CPC ...... *H04L 43/0823* (2013.01); *G06F 11/0709* (2013.01); *G06F 11/0769* (2013.01); *G06F 11/0778* (2013.01); *H04L 67/02* (2013.01)

(58) Field of Classification Search
USPC ........................................................ 709/227
See application file for complete search history.

(56) References Cited

U.S. PATENT DOCUMENTS 6,044,407 A * 3/2000 Jones ...................... H04L 29/06
                                                            709/230
6,324,673 B1 * 11/2001 Luo ........................ G06F 17/5081
                                                            438/17

(Continued)

*Primary Examiner* — Alicia Baturay
(74) *Attorney, Agent, or Firm* — Nixon Peabody LLP; Jeffrey L. Costellia

(57) ABSTRACT

The disclosure discloses a method and a system for processing browser crash information. The method comprises: receiving browser crash status information uploaded when a browser crashes; according to the browser crash status information, generating crash identification information to indicate whether allowing the browser to upload a crash data packet or not; feeding the crash identification information back to the browser; if the crash identification information indicates allowing the browser to upload the crash data packet, receiving crash information including the crash data packet uploaded by the browser; starting up an automatic crash data packet analyzing program to analyze the crash data packet; and sending the analyzing result of the crash data packet back to the browser uploading the crash data packet. The disclosure provides a solution at cloud system level to specifically collect, process, analyze and identify the browser crash information.

18 Claims, 4 Drawing Sheets

(51) Int. Cl.
*H04L 29/08* (2006.01)
*G06F 11/07* (2006.01)

(56) References Cited

U.S. PATENT DOCUMENTS

| | | | | |
|---|---|---|---|---|
| 6,629,267 B1* | 9/2003 | Glerum | G06F 11/0715 | 714/26 |
| 7,028,056 B1* | 4/2006 | Hendel | G06F 11/3636 | |
| 7,089,246 B1* | 8/2006 | O'Laughlen | G06F 17/30867 | 707/784 |
| 7,237,232 B2* | 6/2007 | Smith | G06F 11/3636 | 714/45 |
| 7,289,988 B2* | 10/2007 | Joseph | G06F 9/542 | |
| 7,363,235 B2* | 4/2008 | Urabe | H04N 1/00137 | 705/1.1 |
| 7,398,433 B2* | 7/2008 | Benedek | G06F 11/0709 | 714/38.11 |
| 7,478,330 B1* | 1/2009 | Branson | G06F 17/30899 | 715/234 |
| 7,617,074 B2* | 11/2009 | Beish | G06F 11/3636 | 702/187 |
| 7,882,072 B1* | 2/2011 | Axe | G06F 17/243 | 707/640 |
| 8,112,673 B2* | 2/2012 | Benedek | G06F 11/0709 | 714/38.11 |
| 8,234,367 B2* | 7/2012 | Papierniak | G06F 17/30554 | 709/224 |
| 8,347,386 B2* | 1/2013 | Mahaffey | G06F 21/564 | 726/23 |
| 8,356,211 B2* | 1/2013 | Benedek | G06F 11/0709 | 714/38.11 |
| 8,386,604 B1* | 2/2013 | Kay | G06F 11/3006 | 709/202 |
| 8,544,095 B2* | 9/2013 | Mahaffey | G06F 21/564 | 726/23 |
| 8,577,846 B1* | 11/2013 | Axe | G06F 17/243 | 707/640 |
| 8,677,188 B2* | 3/2014 | Eickmeyer | G06F 11/0709 | 714/38.1 |
| 8,745,202 B2* | 6/2014 | Phillips | H04L 67/125 | 709/224 |
| 8,745,739 B2* | 6/2014 | Mahaffey | G06F 21/564 | 726/22 |
| 8,751,624 B1* | 6/2014 | Jacobson | H04L 43/16 | 709/224 |
| 8,776,028 B1* | 7/2014 | Enakiev | G06F 11/3664 | 714/38.11 |
| 8,819,560 B2* | 8/2014 | Ortwein | G06F 9/542 | 715/207 |
| 8,863,001 B2* | 10/2014 | Kim | G06F 8/61 | 715/738 |
| 8,874,970 B2* | 10/2014 | Benedek | G06F 11/0709 | 714/38.11 |
| 8,875,289 B2* | 10/2014 | Mahaffey | G06F 21/564 | 726/2 |
| 9,021,140 B2* | 4/2015 | Mackey | G06F 11/0709 | 719/318 |
| 9,384,119 B2* | 7/2016 | Eickmeyer | G06F 11/0709 | |
| 9,396,093 B1* | 7/2016 | Enakiev | G06F 11/3664 | |
| 9,444,899 B2* | 9/2016 | Goswami | H04L 67/22 | |
| 9,456,061 B2* | 9/2016 | Felton | H04L 67/02 | |
| 2002/0152228 A1* | 10/2002 | Lopez | G06F 17/30578 | |
| 2004/0111394 A1* | 6/2004 | Fish | G06F 11/0709 | |
| 2005/0177597 A1* | 8/2005 | Elmer | G06F 17/30899 | |
| 2005/0229104 A1* | 10/2005 | Franco | G06F 9/44526 | 715/743 |
| 2012/0218896 A1* | 8/2012 | Ygberg | H04L 41/0816 | 370/235 |
| 2015/0161277 A1* | 6/2015 | Heller | G06F 9/44526 | 715/229 |

\* cited by examiner

METHOD AND SYSTEM FOR PROCESSING BROWSER CRASH INFORMATION

FIELD OF THE INVENTION

The disclosure relates to the field of computer networking technology, in particular to a method and a system for processing the browser crash information.

BACKGROUND OF THE INVENTION

Cloud computing is a distributed computation technology and its fundamental concept is to utilize the network to automatically split a large computing & processing program into numerous smaller subprograms which will be searched, computed and analyzed by a large system consisted of a plurality of servers. After that the results will be sent back to users. By using this technology, the network service provider can achieve the purpose of processing tens of millions of or even billions of messages within seconds so as to provide network service with efficiency as same as the "Super Computer".

When a browser is loading web pages, the browser would become slow or unresponsive for some reason, which would even lead to the computer can not perform other operations. This phenomenon is called as browser crash, which can be caused by many reasons like memory leak, complicated web page code, browser bugs, excessive data on web page and network service flaws.

In Windows system, all types of problems occurring in the operating system are generally uploaded via Windows error report. Since the IE browser is bound with the operating system in Windows, when the browser crashes, the operating system will collect the status information of browser and pack the information into an error report which will be sent back to server. However once the browser crashes, existing technology does not provide a solution at cloud system level to collect, store, analyze and identify the browser crash information.

SUMMARY OF THE INVENTION

Given the problems above, the disclosure provides a browser crash information processing system to overcome abovementioned problems or partly solve these problems as well as corresponding browser crash information processing method.

In one aspect of the invention, a browser crash information processing method is provided and comprises: receiving the browser crash status information uploaded when browser crashes; according to the browser crash status information, generating crash identification information to indicate whether allowing the browser to upload a crash data packet or not; feeding the crash identification information back to the browser; if the crash identification information indicates allowing the browser to upload the crash data packet, receiving crash information including the crash data packet uploaded by the browser; starting up an automatic crash data packet analyzing program to analyze the crash data packet; and sending the analyzing result of the crash data packet back to the browser uploading the crash data packet.

In the other aspect of the invention, a browser crash information system is provided and comprises: a first port, configured to receive the browser crash status information uploaded when a browser crashes; a first cloud crash server, configured to generate crash identification information according to the browser crash status information to indicate whether allowing the browser to upload the crash data packet or not, and feed the crash identification information back to the browser via the first port; a second port, configured to receive the crash information including the crash data packet uploaded by the browser if the crash identification information indicates allowing the browser to upload the crash data packet; an analyzing device, configured to start up an automatic crash data packet analyzing program to analyze the crash data packet; and a sending device, configured to send the analyzing result of the crash data packet back to the browser uploading the crash data packet via the second port.

According to the technical scheme provided by the disclosure, once receiving the browser crash status information uploaded when the browser crashes, the system generates the crash identification information according to the browser crash status information to indicate whether allowing the browser to upload the crash data packet or not, and feeds back to the browser so that the browser can check according to the crash identification information whether to get the green light to upload the crash data packet or not. If allowed, the browser uploads the crash data packet and the cloud starts up the automatic analyzing program to analyze the crash data packet and sends the analyzing result back to the browser. The disclosure provides a solution at cloud system level to specifically collect, process, analyze and identify the browser crash information.

Above description is only an overview of the technical proposal related to the disclosure. To better understand technical means related to the disclosure and implement them according to instructions as well as make abovementioned and other purposes, features and advantages of the disclosure clear and understandable, embodiments specific to the disclosure are listed below.

BRIEF DESCRIPTION OF THE DRAWINGS

Reading description below about preferred embodiments is beneficial to general technical staff in the field easily understanding advantages and benefits. These drawings are only to show preferred embodiments and can not be considered as the limit on the invention. In these drawings, the same part is indicated by the same reference mark.

EMBODIMENTS

Example embodiments are described more fully hereinafter with reference to the accompanying drawings. However, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
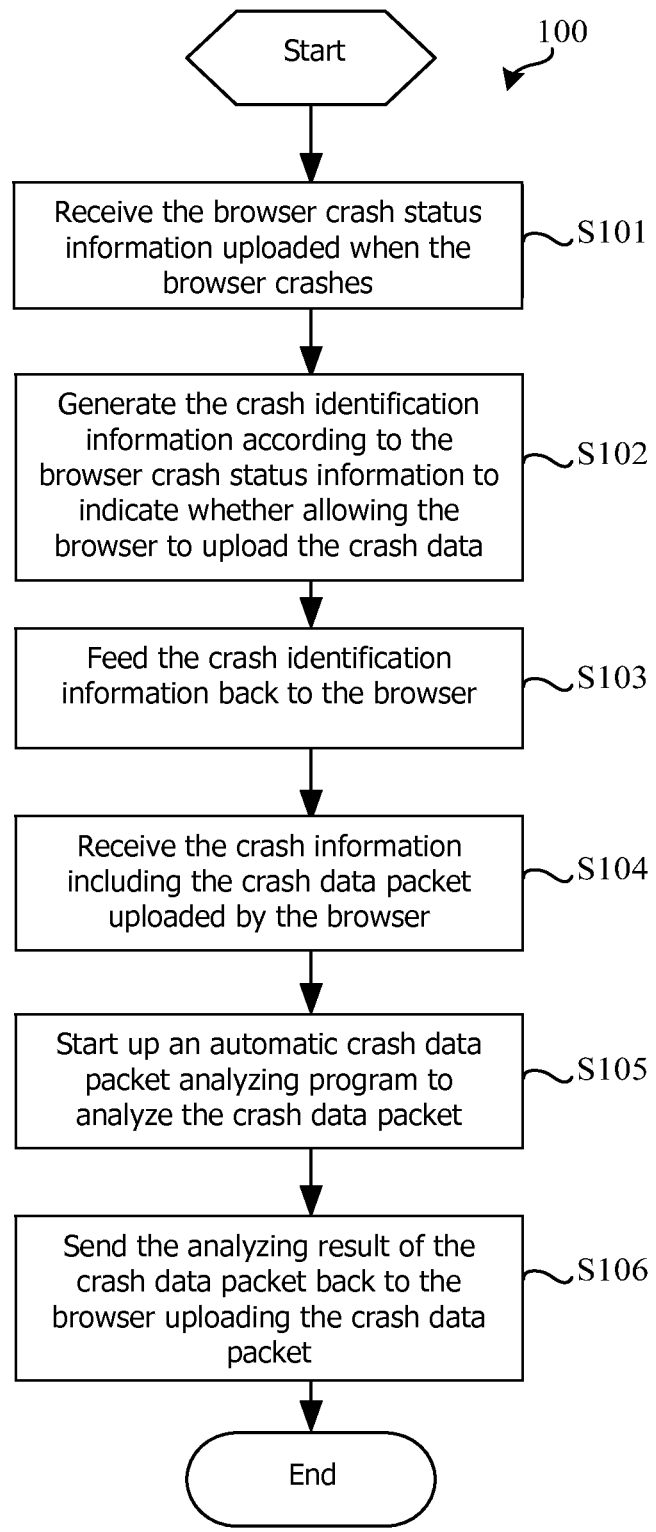
FIG. 1 shows the flowchart for browser crash information processing method according to an embodiment of the disclosure.

FIG. 1 shows the flowchart for browser crash information processing method 100 according to an embodiment of the disclosure. As shown in FIG. 1, the method 100 starts from step S101 for receiving the browser crash status information uploaded when the browser crashes. When the browser crashes, the browser crash status information is first uploaded to the cloud. Optionally, the browser uploads the browser crash status information via a Get port provided by the cloud. As the information about crash status fed back by the browser, the browser crash status information at least includes public parameters (pubkey) of browser crash and optionally includes command lines, a browser product name and a first data checking information at browser side. Wherein the first data checking information at browser side is generated by the browser according to the public parameters of browser crash and a preset key. The public parameters of browser crash at least include related information about crash module, detailed crash offset, crash stack, version number of the browser and version number of the operating system.

Then the method 100 moves to step S102 for generating the crash identification information (dumpid) according to the browser crash status information to indicate whether allowing the browser to upload the crash data packet or not. Generally the cloud generates the crash identification information according to the public parameters of browser crash. Specifically, the cloud extracts the public parameters of browser crash like the related information about crash module, detailed crash offset, the crash stack, the version number of the browser and the version number of the operating system from the browser crash status information and then processes the information according to preset algorithm to generate crash key values (dumpkey). For example, use algorithm MD5 to process above information and generate dumpkeys. The cloud will add up the times of receiving same browser crash status information. The specific approach is to add up the times with same dumpkey. If the amount of same dumpkeys is bigger than or equal to preset threshold (like 3), the number of times of the cloud receiving same browser crash status information is bigger than or equal to 3, so the generated dumpid is 0 which means the browser is not allowed to upload the crash data packet. If the number of same dumpkeys is less than 3, the generated dumpid is bigger than 0 which means the browser is allowed to upload the crash data packet.

Then the method 100 moves to step S103 for feeding the crash identification information back to the browser. The cloud feeds the crash identification information back to the browser and optionally, the cloud feeds the information back to the browser in JSON format. Once the browser receives the crash identification information, if it is not allowed to upload the crash data packet, the information exchange ends up. If it is allowed to upload the crash data packet, move to step S104.

In step S104, the crash information including the crash data packet uploaded by the browser is received. If the crash identification information indicates allowing the browser to upload the crash data packet, the cloud receives the crash data packet uploaded by the browser. Optionally the cloud uses a Post port to receive the crash data packet uploaded by the browser.

After step S104, the method moves to step S105 for starting up an automatic crash data packet analyzing program to analyze the crash data packet. The cloud can monitor the crash data packet uploaded by the browser at any time via arranged automatic crash data packet analyzing program. Once a new crash data packet is found, analyze it immediately and send back the result in time so as to achieve the goal of real-time analysis. The cloud can also call an automatic analyzing interface to analyze the crash data packet uploaded by the browser.

Then the method 100 moves to step S106 for sending the analyzing result of the crash data packet back to the browser uploading the crash data packet. The cloud sends the analyzing result of the crash data packet to corresponding browser according to browser's MID or QID corresponding to the analyzing result of the crash data packet.

Figure 2:
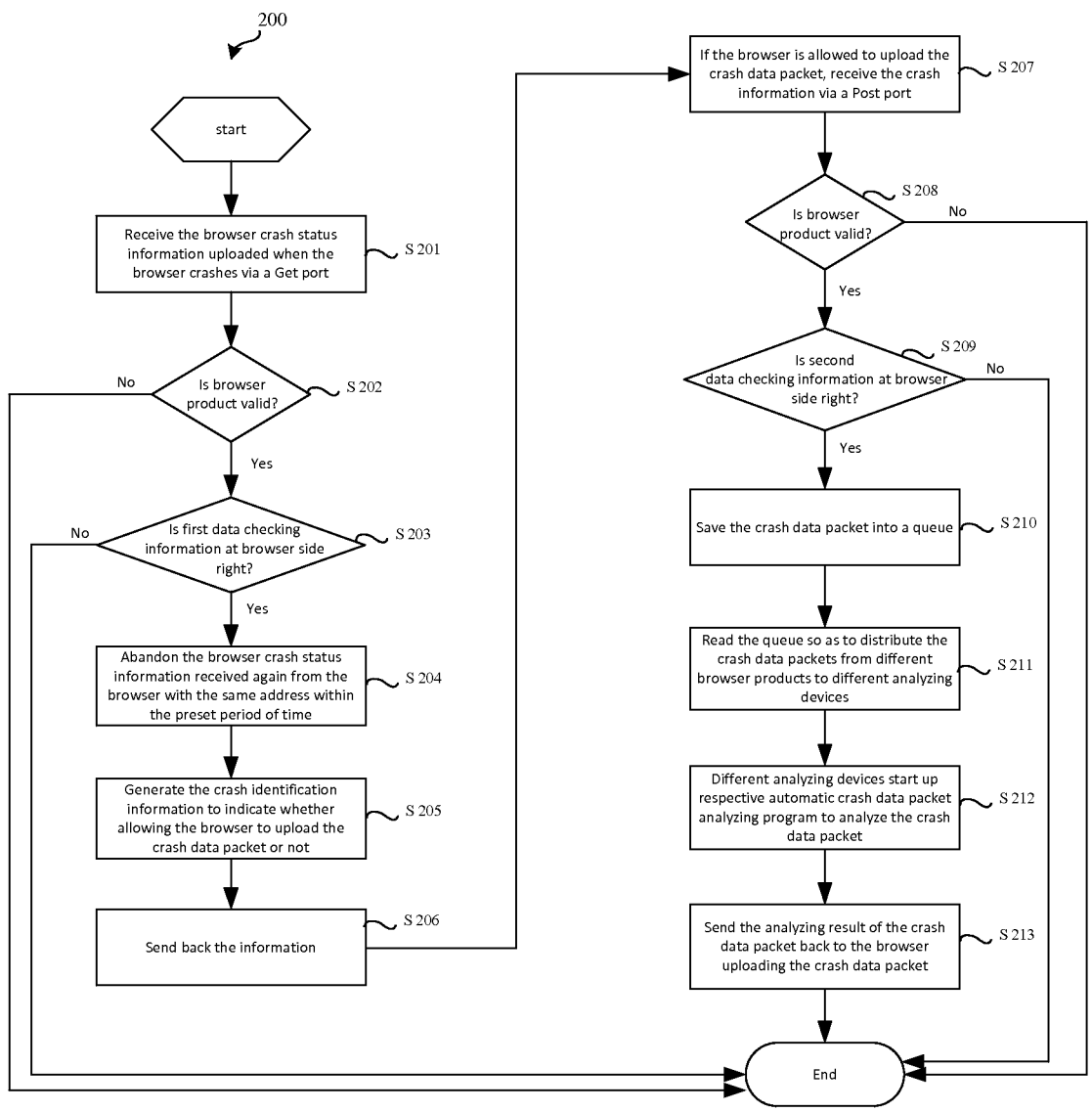
FIG. 2 shows the flowchart for browser crash information processing method according to another embodiment of the disclosure.

FIG. 2 shows the flowchart for browser crash information processing method 200 according to another embodiment of the disclosure. As shown in FIG. 2, the method 200 starts from step S201 for receiving the browser crash status information uploaded when the browser crashes via a Get port. In this method, when the browser crashes, the browser uploads the browser crash status information via a Get port provided by the cloud. What are included in the browser crash status information are listed in Table 1 and public parameters (pubkey) of browser crash, the browser product name (src) and the first data checking information at browser side (cverify1) are mandatory and the command lines (cmd) and customized content (custom) are optional. The type of these information is string.

TABLE 1

Content of browser crash status information

| Parameter | Mandatory | Type and range | Description |
| --- | --- | --- | --- |
| pubkey | true | string | Public parameters of browser. See Table 2 for their value |
| custom | false | string | Customized information. Use underline "_" for separating in case of a plurality of values |
| cmd | false | string | Command lines. Use underline "_" for separating in case of a plurality of values |
| src | true | string | Browser product name |
| cverify1 | true | string | First data checking information at browser side which is used to check the data is valid or not |

Further, the content of pubkey is listed in Table 2. The pubkey includes the related information about crash module, detailed crash offset, the crash stack, the version number of the browser and the version number of the operating system as well as a lot of other information.

TABLE 2

Content of public parameters of browser crash

| Parameter | Description |
| --- | --- |
| process_type | Process type |
| thread_type | Thread type |
| process_stage | Stage of process |
| thread_stage | Stage of thread |
| crash | Crash or abnormality |
| version | Version number of program |
| crash_type | Crash type |
| first_crash_name | Name of first layer crash module: involve unknown |
| first_crash_version | Version number of first layer crash module |
| first_crash_offset | First layer crash offset |
| more_crash_name | Name of detailed crash module: remove unknown |
| more_crash_version | Version number of detailed crash module |

TABLE 2-continued

Content of public parameters of browser crash

| Parameter | Description |
| --- | --- |
| more_crash_offset | Detailed crash offset |
| my_crash_name | Name of my recent crash module |
| my_crash_version | Version number of my recent crash module |
| my_crash_offset | My recent crash module offset |
| mid | mid |
| pid | pid |
| stack_md5 | Crash stack md5 = MD5 (name of crash module + top layer crash module offset) |
| system_version | Version number of operating system |
| ie_version | Version number of ie |
| flash_version | Version number of flash |
| catch_num | Times of abnormalities |
| m | M value |
| ie8_kernel | IE8 core or not |
| open_death | Dummy death proof activated or not |
| process_model | Process model |

Then the method 200 moves to step S202 at which the validity of browser product is checked via checking the browser product name (src). Once receiving the browser crash status information uploaded by the browser, the method extracts src and determines whether the browser is valid via src. If valid, move to step S203. If not, this method ends up.

In step S203, the validity and integrity of crash status information is checked via checking whether the first data checking information at browser side is correct or not (cverify1). The cverify1 is generated by the browser based on pubkey and preset key. For example: cverify1=MD5 (pubkey+key) means to use MD5 algorithm to encrypt pubkey and the preset key and get cverify1. Once receiving the browser crash status information uploaded by the browser, the method extracts cverify1 and determines whether cverify1 is correct or not. If correct, it is indicated the crash status information is valid and integral and move to step S204. If not, this method ends up.

In step S204, abandon the browser crash status information received again from the browser with the same address within a preset period of time. To avoid the browser continuously submitting same information in a short time (e.g. 2 s), limit the submitting via buffer and the information submitted repeatedly in a short time is considered as one piece of information. Judging rule is based on cverify1.

Then the method 200 moves to step S205 for generating the crash identification information (dumpid) according to the browser crash status information to indicate whether allowing the browser to upload the crash data packet or not. Specifically, the cloud extracts the related information about crash module, detailed crash offset, the crash stack, the version number of the browser and the version number of the operating system from pubkey and then generates crash key values (dumpkey) according to these information. For example, dumpkey=MD5 (crash module+detailed crash offset+crash stack md5+IE version number+version number of the operating system) means to use MD5 algorithm to encrypt these information and get dumpkey. The cloud will add up the times of receiving the same browser crash status information. The specific approach is to add up the times with the same dumpkey. If the amount of the same dumpkeys is bigger than or equal to the preset threshold (like 3), the number of times of the cloud receiving same browser crash status information is bigger than or equal to 3, so the generated dumpid is 0 which means the browser is not allowed to upload the crash data packet. If the number of the same dumpkeys is less than 3, the generated dumpid is bigger than 0 which means the browser is allowed to upload the crash data packet.

Then the method 200 moves to step S206 for feeding the crash identification information back to the browser. Both the crash identification information and the first data checking information at server side (sverify1) shall be fed back at the same time so that the browser can check the validity and integrity of the crash identification information. The first data checking information at server side is generated by the cloud based on dumpid and the preset key. For example: sverify1=MD5(dumpid+key) means to use MD5 algorithm to encrypt dumpid and the preset key and get sverify1. The cloud packs the crash identification information and the first data checking information at server side into downlink information which could be in JSON format and feeds it back to the browser. For example, the downlink information fed by the cloud back to the browser could be:

{"dumpid":"0", "sverify1":"sverify1_val"} or {"dumpid":"dump_id", "sverify1":"sverify1_val"}

Wherein sverify1_val is the value of sverify1.

Once receiving the downlink information, the browser extracts dumpid. If dumpid is 0, the cloud does not allow the browser to upload the crash data packet and the information exchange ends up. If dumpid is dump_id, the cloud allows the browser to upload the crash data packet and then the method moves to step S207.

In step S207, the crash information including the crash data packet uploaded by the browser is received via a Post port. If the crash identification information indicates the browser is allowed to upload the crash data packet, the cloud receives the crash information including the crash data packet uploaded by the browser. The content of the crash information is listed in Table 3 including the browser product name (src), the crash identification information (dumpid), the crash data packet (file) and the second data checking information at browser side (cverify2).

TABLE 3

Crash information

| Parameter | Mandatory | Type and range | Description |
| --- | --- | --- | --- |
| src | true | string | Browser product name |
| dumpid | true | string | dump_id returned from cloud |
| file | true | string | dump file stream |
| cverify2 | true | string | Second data checking information at browser side which is used to check the data is valid or not |

Then the method 200 moves to step S208 at which the validity of browser product is checked via checking the browser product name (src). Once receiving the browser crash status information uploaded by the browser, the method extracts src and determines whether the browser is valid via src. If valid, this method moves to step S209. If not, this method ends up.

In step S209, the validity and integrity of the crash status information is checked via checking whether the second data checking information at browser side is correct or not (cverify2). The cverify2 is generated by the browser based on the crash data packet, the crash identification information and the preset key. For example: cverify2=MD5 (content of file+dump_id+key) means to use MD5 algorithm to encrypt the content of file, dump_id and the preset key and get cverify2. Once receiving the browser crash status information uploaded by the browser, the method extracts cverify2 and determines whether cverify2 is correct. If correct, it is indicated the crash status information is valid and integral and then this method moves to step S210. If not, this method ends up.

In step S210, the crash data packet is saved into a queue. The crash data packets received by the cloud come from many client browsers. On one hand, the cloud crash server on the cloud saves the crash data packet uploaded by the browser as a temporary file and moves it to a temporary directory. On the other hand, the cloud crash server saves the crash data packet uploaded via Post port into the queue (each server can have a queue) and then returns information to the browser to inform whether the browser successfully uploads data or not. The information returned by the cloud to the browser is as follows:

{"status":"0", "sverify2:"sverify2_val"}
or {"status":"1", "sverify2:"sverify2_val"} status=0 means the browser fails to upload data and status=1 means the browser successfully uploads data. sverify2 refers to the second data checking information at server side and is generated according to status, dump_id and the preset key. For example, sverify2=MD5(status+dump_id+key) means to use MD5 algorithm to encrypt status, dump_id and the preset key and get sverify2. sverify2_val is the value of sverify2.

The cloud crash server can save the crash data packet into a nonvolatile memory such as Cassandra database.

Then the method 200 moves to step S211 and reads the queue so as to distribute the crash data packets from different browser products to different analyzing devices. The cloud crash server reads the queue and synchronizes the crash data packets from different browser products into a Windows directory under environment with multiple Windows computers. If the cloud crash server is installed with Linux operating system, the Linux system can use rsync based on C/S mode software to realize synchronizing file to a Windows directory. As a data mirroring and backup tool, the rsync can mirror and save complete directory tree and file system. The crash data packet which has been synchronized to the Windows directory will be removed from the temporary directory.

Then the method moves to step S212 at which different analyzing devices start up respective automatic crash data packet analyzing program for analyzing. This step can be performed in two ways: one is to arrange an automatic crash data packet analyzing program on the Windows machine to monitor files in current directory. Once a new crash data packet is found, analyze it immediately and send back the result in time. The other is that the Windows machine calls an automatic analyzing interface on another cloud crash server to analyze the crash data packet.

Then the method 200 moves to step S213 for sending the analyzing result of the crash data packet back to the browser uploading the crash data packet.

This method can further include the step for saving the analyzing result of the crash data packet into a database in the manner of incremental indexing at a preset time interval. Specifically, the analyzing result is organized with MYSQL (master+slave)+SPHINX framework and the adopted technology is for separation of master and slave databases and sheet separation by month. The MYSQL is a permanent storage engine and data is automatically synchronized between master and slave MYSQLs. The master MYSQL is dedicated for insertion of analyzing result. For example the abovementioned cloud crash server inserts the analyzing result into the master MYSQL. The slave MYSQL is used for management by administrator or as the index source of SPHINX server so that the SPHINX index server can perform incremental indexing on the continuously renewed analyzing result of crash data packet and thus realize real-time data retrieval by administrator. Specifically, the SPHINX index server utilizes incremental indexing and merge indexing to realize real-time data updating every 5 minutes. When the data size in database is big and new data is continuously added into the database, rebuild all indexes will consume a lot of resources. In fact, the size of original data which has to be updated is small. For example, there are millions of pieces of original data and only thousands of pieces of data are newly added, so the mode "main index+incremental indexing" can be used to realize near real-time updating.

This method can also include: putting received crash status information into the queue and starting up a process to save the crash status information in the queue into the master MYSQL.

On one hand, the administrator can use the SPHINX index server to retrieve the crash status information collected from MySQL to find out which IE version has the most of crashes, which main program has the most of crashes and which type of crash occurs the most. It directly provides the early warning information for crash in the crash status information according to the amount of requests of above listed information. The retrieved data will be sent back to the browser which submits the crash data packet for displaying to warn the user which IE version has the most of crashes. For example, respective monitoring result of all versions of browsers or comparison result among versions can be displayed. Mathematical statistics for various problems of each browser version can be displayed. Or once the amount of problems exceeds preset threshold, it can directly warn the user via a short message.

On the other hand, the analyzing result of the crash data packet stored on MySQL can include the following information: name of crash module or function which has been analyzed (or crash condition of key module e.g. the information about key crash module obtained via analyzing and statistics according to collected crash information); operation or action performed before calling the above crash module or function (like variable name conflict, memory crash, etc.); and the content to be reconfirmed according to needs (subsequently extended content). So the administrator can further search MySQL for record of analyzing result, obtain analyzing result of appointed machine identification (MID) via SPHINX index server, and then display it on a client browser according to MID and warn the client browser. Optionally, besides above MID, the browser user's identification (QID) of analyzing result can be obtained at the cloud crash server side and this QID is the unique identifier for browser user and will be used as the unique identifier at user login. Thus the crash analysis can be performed for specific user (corresponding to QID) so as to realize early warning for specific user.

In conclusion, early warning based on the crash status information and/or the analyzing result of crash can be obtained in time according to the crash data packet or the crash status information submitted by logged-in or unlogged-in user of the browser so as to realize real-time and personalized warning.

As described in above embodiment, once receiving the browser crash status information uploaded when the browser crashes, the method generates the crash identification information according to the browser crash status information to indicate whether allowing the browser to upload the crash data packet or not, and feeds back to the browser so that the browser can check according to the crash identification information whether to get the green light to upload the crash data packet or not. If allowed, the browser uploads the crash data packet and the cloud starts up the automatic analyzing program to analyze the crash data packet and sends the analyzing result back to the browser. The method provides a solution at cloud system level to specifically collect, process, analyze and identify the browser crash information.

Figure 3:
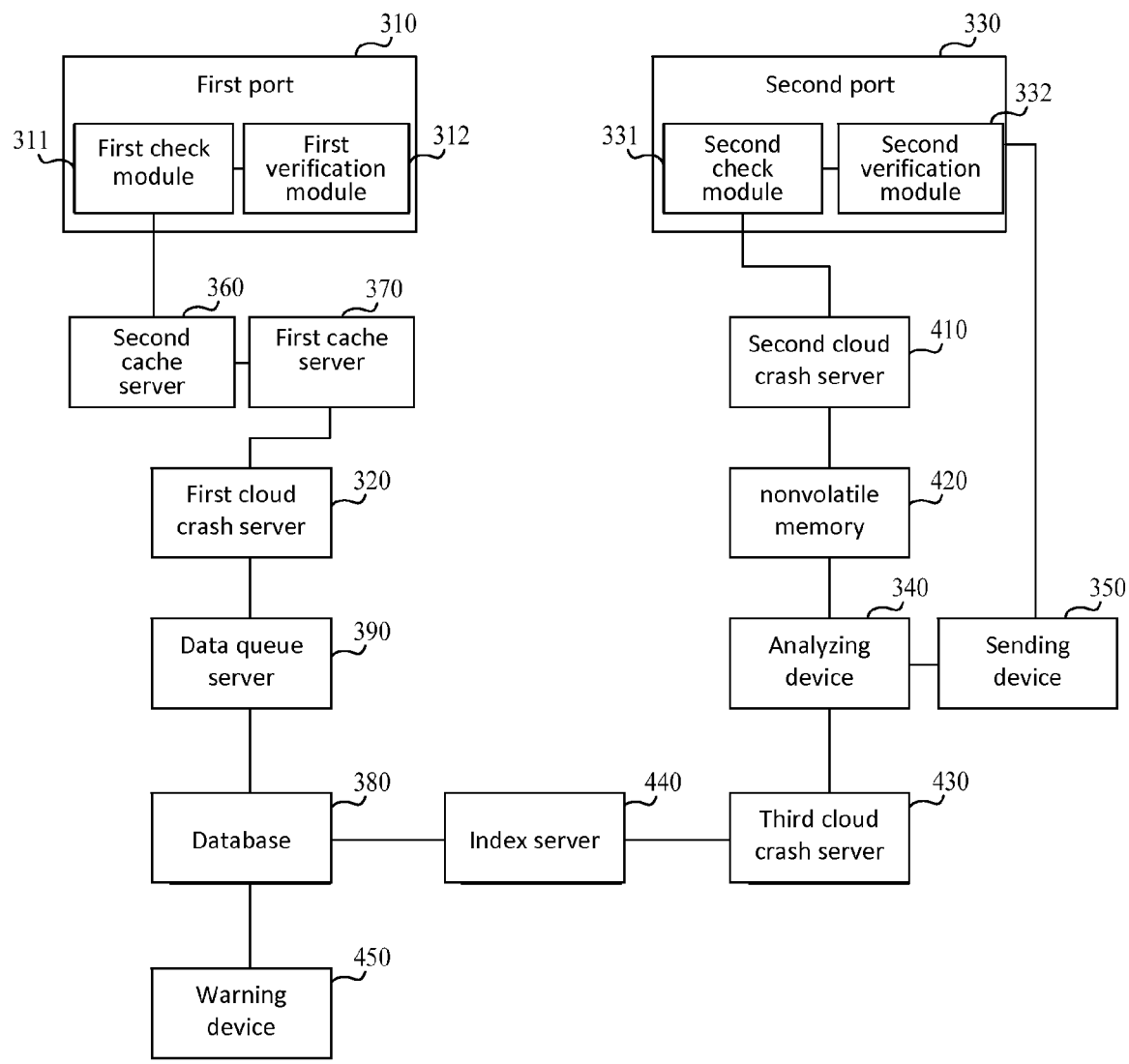
FIG. 3 shows the structure diagram for browser crash information processing system according to an embodiment of the disclosure.

FIG. 3 shows the structure diagram for browser crash information processing system according to an embodiment of the disclosure. As shown in FIG. 3, the system comprises a first port 310, a first cloud crash server 320, a second port 330, an analyzing device 340 and a sending device 350.

Wherein the first port 310 is configured to receive the browser crash status information uploaded when the browser crashes. Optionally, the first port 310 is a Get port. The browser crash status information at least includes one or several pieces of following information: the public parameters of browser crash, the command lines, the browser product name and the first data checking information at browser side. The first data checking information at browser side is generated by the browser according to the public parameters of browser crash and the preset key. The public parameters of browser crash at least include following information: the related information about crash module, detailed crash offset, the crash stack, the version number of the browser and the version number of the operating system. See the description of above embodiment for the content of browser crash status information.

The system can further comprise a first check module 311 and/or a first verification module 312. As shown in FIG. 3, the first check module 311 and the first verification module 312 are integrated into the first port 310 but the embodiment does not limit to this. The first check module 311 is configured to check the validity and integrity of the crash status information via checking whether the first data checking information at browser side is correct or not. The first verification module 312 is configured to verify the validity of browser product via checking the browser product name.

The system can also comprises a second cache server 360 configured to abandon the browser crash status information received again from the browser with the same address within the preset period of time. To avoid the browser continuously submitting same information in a short time (e.g. 2 s), limit the submitting via buffer and the information submitted repeatedly in a short time is considered as one piece of information. Judging rule is based on the first data checking information at browser side.

The first cloud crash server 320 is configured to generate the crash identification information according to the browser crash status information to indicate whether allowing the browser to upload the crash data packet or not. The crash identification information is fed back to the browser via the first port 310. Optionally the system also comprises a first cache server 370 for processing the public parameters of browser crash according to preset algorithm to generate crash key values. The first cloud crash server 320 is configured to obtain the crash identification information according to the crash key values to indicate whether allowing the browser to upload the crash data packet or not. Specifically, the first cache server 370 extracts the related information about crash module, detailed crash offset, the crash stack, the version number of the browser and the version number of the operating system from the public parameters of browser crash and generates crash key values (dumpkey) according to these information. For example, use MD5 algorithm to encrypt these information and get dumpkey. The first cloud crash server 320 will add up the times of receiving the same browser crash status information. The specific approach is to add up the times with the same dumpkey. If the amount of the same dumpkeys is bigger than or equal to preset threshold (like 3), the number of times of the cloud receiving the same browser crash status information is bigger than or equal to 3, so the generated dumpid is 0 which means the browser is not allowed to upload the crash data packet. If the number of same dumpkeys is less than 3, the generated dumpid is bigger than 0 (if dumpid=dump_id, dump_id is a value bigger than 0) which means the browser is allowed to upload the crash data packet.

Optionally, the first cloud crash server 320 can also be used to generate the first data checking information at server side according to the crash identification information and the preset key. Both the crash identification information and the first data checking information at server side shall be fed back to the browser at the same time so that the browser can check the validity and integrity of the crash identification information via checking the first data checking information at server side.

Once receiving above downlink information, the browser extracts dumpid. If dumpid is 0, the cloud does not allow the browser to upload the crash data packet and the information exchange ends up. If dumpid is dump_id, the cloud allows the browser to upload the crash data packet.

The system also comprises a database 380 and a data queue server 390. The data queue server 390 is configured to put the crash status information into the queue and start up a process to save the crash status information in the queue into the database 380.

The second port 330 is configured to receive the crash information including the crash data packet uploaded by the browser if the crash identification information indicates allowing the browser to upload the crash data packet. Optionally the second port 330 is a Post port. The crash information includes the browser product name, the crash identification information, the crash data packet and the second data checking information at browser side. The second data checking information at browser side is generated according to the crash data packet, the crash identification information and the preset key. See the description of above embodiment for the content of crash information.

The system can further comprise a second check module 331 and/or a second verification module 332. As shown in FIG. 3, the second check module 331 and the second verification module 332 are integrated into the second port 330 but the embodiment does not limit to this. The second check module 331 is configured to check the validity and integrity of the crash information via checking whether the second data checking information at browser side is correct or not. The second verification module 332 is configured to verify the validity of the browser product via checking the browser product name.

The system can further comprise a second cloud crash server 410 and a nonvolatile memory 420. The second cloud crash server 410 is configured to extract the crash data packet from the crash information and save the crash data packet into the queue, as well as read the queue so as to distribute the crash data packets from different browser products to different analyzing devices. The nonvolatile memory 420 is configured to save the crash data packet. The crash data packets received by the second cloud crash server 410 come from many client browsers. On one hand, the second cloud crash server 410 saves the uploaded crash data packet as a temporary file and moves it to a temporary directory. On the other hand, the second cloud crash server 410 saves the crash data packet uploaded via Post port into the queue (each server can have a queue) and then returns information to the browser to inform whether the browser successfully uploads data or not. The second cloud crash server 410 also saves the crash data packet into the non-volatile memory 420 which can be a Cassandra database.

The analyzing device 340 is configured to start up an automatic crash data packet analyzing program to analyze the crash data packet. In this system, the analyzing device 340 can comprise a plurality of Windows machines under Windows environment. For example, if the second cloud crash server 410 is installed with Linux operating system, the Linux system can use rsync based on C/S mode software to realize synchronizing file to a Windows directory. As a data mirroring and backup tool, the rsync can mirror and save complete directory tree and file system. The analyzing device 340 can further be used for monitoring the crash data packet uploaded by the browser at any time via arranged automatic crash data packet analyzing program. Once a new crash data packet is found, analyze it immediately and send back the result in time. Or call an automatic analyzing interface to analyze the crash data packet uploaded by the browser.

The sending device 350 is configured to send the analyzing result of the crash data packet back to the browser uploading the crash data packet via the second port 330. The sending device 350 is further configured to send the analyzing result of the crash data packet to corresponding browser according to the browser's machine identification or the browser user's identification corresponding to the analyzing result of the crash data packet.

The system can also comprise: a third cloud crash server 430 and an index server 440. The third cloud crash server 430 is configured to transmit the analyzing result obtained through the analyzing device 340 to the index server 440. The index server 440 is configured to save the analyzing result of the crash data packet into the database 380 in the manner of incremental indexing at the preset time interval. Specifically, the system adopts MYSQL (master+slave)+ SPHINX framework which means the database 380 comprises a master MYSQL and a slave MYSQL and the index server 440 is a SPHINX index server. The technology adopted by the database 380 is for separation of master and slave databases and sheet separation by month. The MYSQL is a permanent storage engine and data is automatically synchronized between master and slave MYSQLs. The master MYSQL is dedicated for insertion of analyzing result. For example the above third cloud crash server 430 provides an automatic analyzing interface to the analyzing device 340 and inserts the analyzing result into the master MYSQL. The slave MYSQL is used for management by administrator or as the index source of SPHINX server so that the SPHINX index server can perform incremental indexing on the continuously renewed analyzing result of crash data packet and thus realize real-time data retrieval by administrator.

The system can also comprise a warning device 450 configured to perform statistical analysis on data stored in the database and warn if the statistic result exceeds preset threshold. On one hand, the administrator can use the SPHINX index server to retrieve the crash status information collected from MySQL to find out which IE version has the most of crashes, which main program has the most of crashes and which type of crash occurs the most. It directly provides the early warning information for crash in the crash status information according to the amount of requests of above listed information. The retrieved data will be sent back to the browser which submits the crash data packet for displaying to warn the user which IE version has the most of crashes. For example, respective monitoring result of all versions of browsers or comparison result among versions can be displayed. Mathematical statistics for various problems of each browser version can be displayed. Or once the amount of problems exceeds preset threshold, it can directly warn the user via a short message. On the other hand, the analyzing result of the crash data packet stored on MySQL can include the following information: the name of crash module or function which has been analyzed (or crash condition of key module e.g. the information about key crash module obtained via analyzing and statistics according to collected crash information); operation or action performed before calling above crash module or function (like variable name conflict, memory crash, etc.); and the content to be reconfirmed according to needs (subsequently extended content). So the administrator can further search MySQL for record of analyzing result, obtain analyzing result of appointed machine identification (MID) via SPHINX index server, and then display it on a client browser according to MID and warn the client browser. Optionally, besides above MID, the browser user's identification (QID) of analyzing result can be obtained at the cloud crash server side and this QID is the unique identifier for browser user and will be used as the unique identifier at user login. Thus the crash analysis can be performed for specific user (corresponding to QID) so as to realize early warning for specific user. In conclusion, early warning based on the crash status information and/or the analyzing result of crash can be obtained in time according to the crash data packet or the crash status information submitted by logged-in or unlogged-in user of browser so as to realize real-time and personalized warning.

As described in above embodiment, once the system receives the browser crash status information uploaded when the browser crashes via the first port, the first cloud crash server generates the crash identification information according to the browser crash status information to indicate whether allowing the browser to upload the crash data packet or not, and feeds back to the browser via the first port so that the browser can check according to the crash identification information whether to get the green light to upload the crash data packet or not. If allowed, the browser uploads the crash data packet and the cloud receives the crash data packet via the second port. The analyzing device starts up the automatic analyzing program to analyze the crash data packet and then the sending device sends the analyzing result back to the browser. The system provides a solution at cloud system level to specifically collect, process, analyze and identify the browser crash information.

In this algorithm, and the display is not provided to any particular computer or other device-specific virtual system related. Various general purpose systems may also be used in conjunction with the teachings of this is based on. According to the above description, the structure of the desired configuration these systems are obvious. Furthermore, the present invention is not directed against any particular programming language. It should be appreciated that a variety of programming languages can be used to realize the content of the present invention described herein, and the above description is made to the disclosure of the specific language preferred embodiment of the present invention.

In the description provided herein, numerous specific details are described. However, it is understood that the embodiments of the present invention may be practiced without these specific details. In some instances, it has not been shown in detail well-known methods, structures and techniques, so as not to obscure the understanding of this description.

It should be understood that in order to streamline the disclosure and to help understand various aspects of the invention, one or more, in the above description of exemplary embodiments of the present invention, the various features of the invention are sometimes grouped together in a single embodiment, Figure, or description thereof in. However, this method should not be interpreted as reflecting disclosed an intention: that the claimed invention requires features in each claim than those specifically described in more features. More specifically, as reflected in the book of the following claims, inventive aspects lie in less than all features of a single foregoing disclosed embodiment. Thus, the claims following the requirements of the specific embodiment thus expressly incorporated this particular embodiment, each claim itself as a separate embodiment of the present invention.

Those skilled in the art can appreciate that the embodiments of the device module adaptively changed and set them in connection with the embodiment of one or more different devices. Embodiments can be combined in a module or unit or module into a module or unit or module, and in addition they can be divided into a plurality of sub-modules or sub-units or sub-assemblies. In addition to any method such features and/or process, or at least some of the units are mutually exclusive outside, you can use any combination of this document (including the accompanying claims, abstract and drawings), as well as all the features disclosed so openly or All process equipment or unit combination. Unless explicitly stated otherwise, each feature of the present specification (including the accompanying claims, abstract and drawings) may be provided by the same, equivalent or similar purpose alternative features instead.

Moreover, those skilled in the art will appreciate that although in some embodiments described herein include certain features included in other embodiments, rather than other features, combinations of features of different embodiments are meant in the present and forming within the scope of the invention to different embodiments. For example, in the book the following claims, any of the claimed embodiments can be in any one of the combinations used.

In the present embodiment of the invention may be implemented in hardware, or in on one or more processors running software modules, or in a combination thereof. Those skilled in the art will appreciate, the microprocessor may be used or a digital signal processor (DSP) in practice to implement some or all of the functionality of some or all of the components of the embodiment of the browser crash information processing system in accordance with the present invention. The present invention may also be implemented as a part or all of a device or apparatus programs (e.g. computer programs and computer program products) performing the method described herein is provided. Such programs embodying the present invention may be stored on a computer readable medium, or may have the form of one or more signals. Such signals can be downloaded from the Internet website, or provided on a carrier signal, or in any other form.

Figure 4:
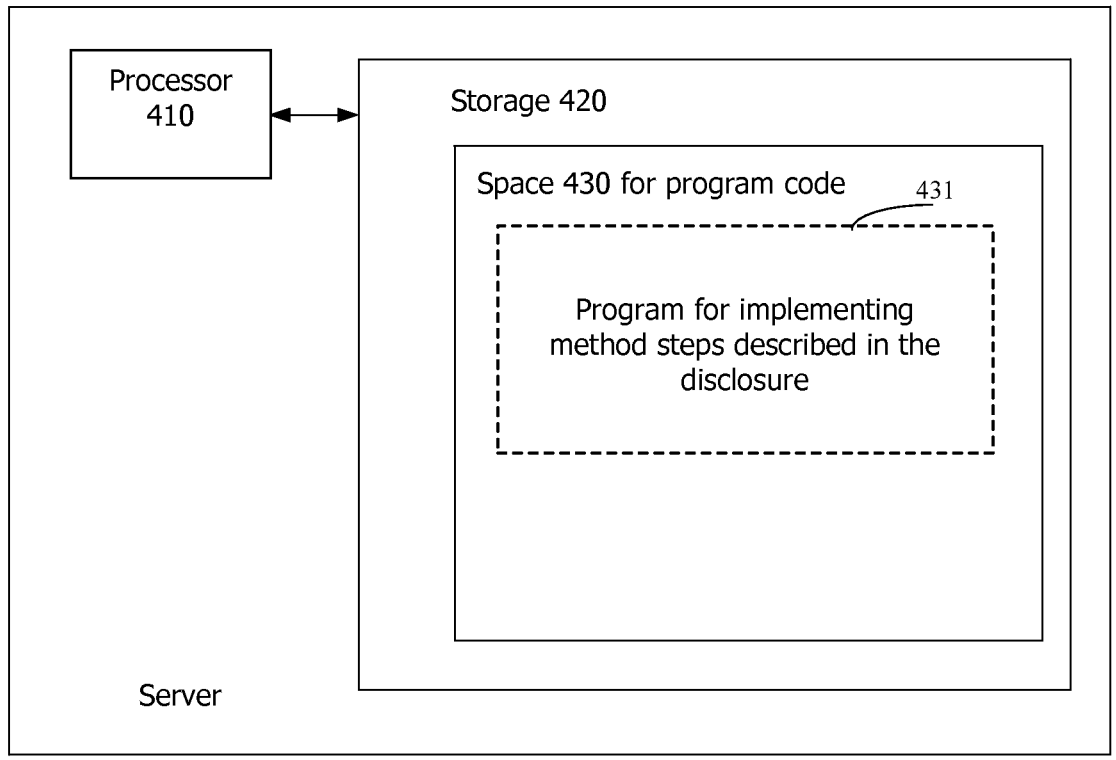
FIG. 4 shows the diagram for a server implementing the method related to the invention according to an embodiment of the disclosure.

For example, FIG. 4 shows a server which can implement the method described in the disclosure according to an embodiment of the disclosure, like an application server.

Figure 5:
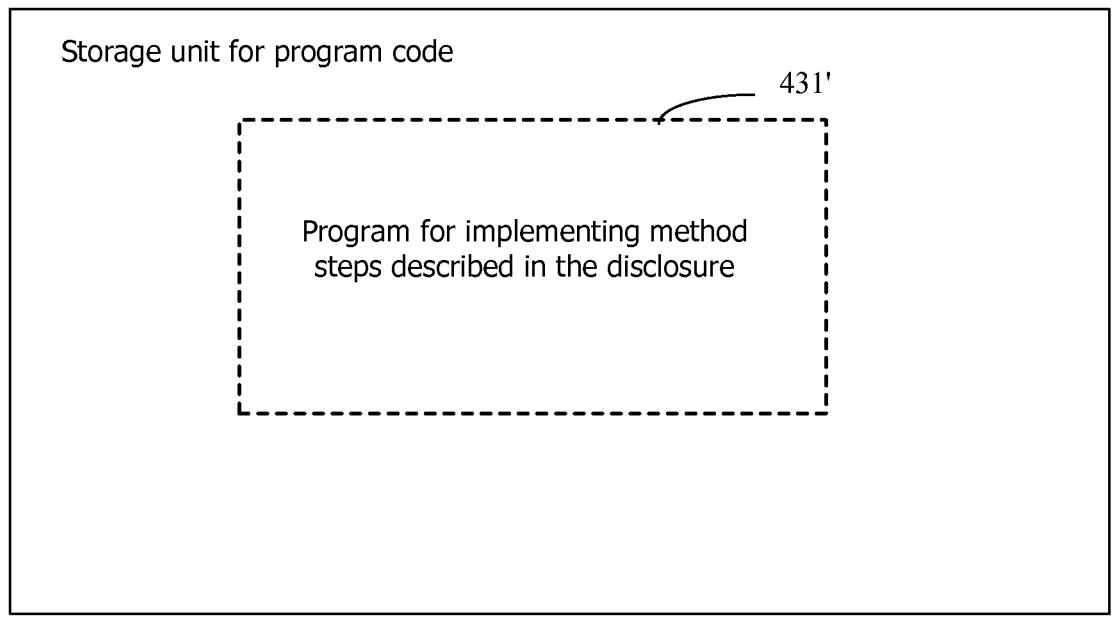
FIG. 5 shows a memory unit on which the program code for realizing the method related to the disclosure is kept or carried according to an embodiment of the disclosure.

The server conventionally comprises a processor 410 and a computer program product or a computer readable medium in the form of a storage 420. The storage 420 may be electronic type such as a flash, an EEPROM (electrically erasable programmable read only memory), an EPROM, a hard disc or a ROM. The storage 420 has a storage space 430 for the program code 431 which is used for implementing any step described in above method. For example, the storage space 430 for the program code can contain each program code 431 which is used for realizing each step described in above method. These program codes can be read from or written into one or a plurality of computer program products. The computer program product comprises program code carriers such as hard disk, compact disk (CD), memory card or floppy disk. Such a computer program product is generally a portable or fixed storage unit as described with reference FIG. 5. The storage unit may have a storage section or storage space arranged similar to the storage 420 in the server shown in FIG. 4. The program code may for example be compressed in an appropriate form. Typically, the storage unit includes a computer readable code 431' i.e. the code read by the processor 410 and the like, such as the code when executed by the server, causing the server to execute the method described above in the respective steps.

"One embodiment", "embodiments" or "one or more embodiments" referred to in this document means that a particular feature, structure, or characteristic as described in the embodiment is included in at least one embodiment of the present invention. Also, please note that the words "in one embodiment" are not necessarily all referring to the same example of embodiment.

It should be noted that the abovementioned embodiments of the present invention will be describing the present invention rather than limiting, and that those skilled in the art without departing from the scope of the appended claims may be devised alternative embodiments. In the claims, should not be located configured to restrict any reference signs between parentheses rights requirements. The word "comprising" does not exclude the presence in the claims listed elements or steps. The word "a" or "one" located before element does not exclude the existence of a plurality of such elements. The present invention may be by means of hardware comprising several distinct elements, and by means of a suitably programmed computer to achieve. In enumerating several means of unit claim, several of these means may be by the same item of hardware embodied. Word first, second, and third, etc. does not denote any order. These words can be interpreted as a name.

In addition, it should be noted that the language used in this specification primarily for the purposes of readability and teachings selected, rather than to explain or define the inventive subject matter selected. Accordingly, in the appended claims without departing from the scope and spirit of the book, those of ordinary skill in the art many modifications and variations are obvious. For the scope of the invention, the present invention made public is illustrative and not restrictive, and the scope of the invention defined by the appended claims

The invention claimed is:

1. A method for processing browser crash information, comprising:
   receiving browser crash status information uploaded when a browser crashes;

according to the browser crash status information, generating crash identification information to indicate whether allowing the browser to upload a crash data packet or not feeding the crash identification information back to the browser;

if the crash identification information indicates allowing the browser to upload the crash data packet, receiving crash information including the crash data packet uploaded by the browser;

starting up an automatic crash data packet analyzing program to analyze the crash data packet; and sending the analyzing result of the crash data packet back to the browser uploading the crash data packet, wherein the step of according to the browser crash status information, generating crash identification information to indicate whether allowing the browser to upload the crash data packet or not further comprises:

processing public parameters of browser crash included in the browser crash status information according to preset algorithm to generate crash key values;

obtaining the crash identification information according to the crash key values to indicate whether allowing the browser to upload the crash data packet or not.

2. The method according to claim 1, wherein the browser crash status information further includes one or several pieces of following information: command lines, a browser product name and a first data checking information at browser side;

wherein the first data checking information at browser side is generated by the browser according to the public parameters of browser crash and a preset key.

3. The method according to claim 1, wherein before the step of processing the public parameters of browser crash according to preset algorithm to generate crash key values, the method further comprises: checking the validity and integrity of crash status information by checking whether the first data checking information at browser side is correct or not.

4. The method according to claim 1, wherein before the step of processing the public parameters of browser crash according to preset algorithm to generate crash key values, the method further comprises: verifying the validity of the browser product by checking the browser product name.

5. The method according to claim 1, wherein after the step of receiving the browser crash status information uploaded when the browser crashes, the method further comprises: abandoning the browser crash status information received again from the browser with the same address within a preset period of time.

6. The method according to claim 1, wherein both the crash identification information and the first data checking information at server side shall be fed back to the browser at the same time so that the browser can check the validity and integrity of the crash identification information via checking the first data checking information at server side;

wherein the first data checking information at server side is generated according to the crash identification information and a preset key.

7. The method according to claim 1, wherein after the step of receiving crash information including the crash data packet uploaded by the browser, the method further comprises:

saving the crash data packet into a queue;

reading the queue and distributing crash data packets from different browser products to different analyzing devices;

the step of starting up an automatic crash data packet analyzing program to analyze the crash data packet comprises: different analyzing devices start up respective automatic crash data packet analyzing program to analyze the crash data packet;

the crash information also includes a second data checking information at browser side which is generated according to the crash data packet, the crash identification information and a preset key;

wherein before the step of saving the crash data packet into the queue, the method further comprises: checking the validity and integrity of the crash information via checking whether the second data checking information at browser side is correct or not.

8. The method according to claim 1, wherein the step of starting up an automatic crash data packet analyzing program to analyze the crash data packet further comprises:

monitoring the crash data packet uploaded by the browser at any time via arranged automatic crash data packet analyzing program; analyzing a new crash data packet immediately once it is found and sending back the result in time;

or calling an automatic analyzing interface to analyze the crash data packet uploaded by the browser.

9. The method according to claim 1, wherein the method further comprises: saving the analyzing result of the crash data packet into a database in the manner of incremental indexing at a preset time interval; and performing statistical analysis on the data stored in the database and warning if the statistic result exceeds a preset threshold.

10. The method according to claim 1, wherein the step of sending the analyzing result of the crash data packet back to the browser uploading the crash data packet further comprises: sending the analyzing result of the crash data packet to corresponding browser according to a browser's machine identification or browser user's identification corresponding to the analyzing result of the crash data packet.

11. A system for processing browser crash information, comprising:

a first port, configured to receive browser crash status information uploaded when a browser crashes;

a first cloud crash server, configured to generate crash identification information according to the browser crash status information to indicate whether allowing the browser to upload a crash data packet or not, and feed the crash identification information back to the browser via the first port;

a second port, configured to receive the crash information including the crash data packet uploaded by the browser if the crash identification information indicates allowing the browser to upload the crash data packet;

an analyzing device, configured to start up an automatic crash data packet analyzing program to analyze the crash data packet; and a sending device, configured to send the analyzing result of the crash data packet back to the browser uploading the crash data packet via the second port, wherein the system further comprises: a first cache server, configured to process public parameters of browser crash included in the browser crash status information according to preset algorithm to generate crash key values;

the first cloud crash server is configured to obtain the crash identification information according to the crash key values to indicate whether allowing the browser to upload the crash data packet or not.

12. The system according to claim 11, wherein the browser crash status information further includes one or several pieces of following information: command lines, a browser product name and a first data checking information at browser side;

wherein the first data checking information at browser side is generated by the browser according to the public parameters of browser crash and a preset key.

13. The system according to claim 11, wherein the system further comprises: a second cache server, configured to abandon the browser crash status information received again from the browser with the same address within a preset period of time.

14. The system according to claim 11, wherein the first cloud crash server is further configured to generate the first data checking information at server side according to the crash identification information and a preset key; feed both the crash identification information and the first data checking information at server side back to the browser at the same time so that the browser can check the validity and integrity of the crash identification information via checking the first data checking information at server side.

15. The system according to claim 11, wherein the system further comprises:

a second cloud crash server, configured to extract the crash data packet from the crash information and save the crash data packet into a queue, as well as read the queue and distribute crash data packets from different browser products to different analyzing devices;

and a nonvolatile memory, configured to save the crash data packets.

16. The system according to claim 15, wherein the crash information also includes a second data checking information at browser side which is generated according to the crash data packet, the crash identification information and a preset key;

wherein the system further comprises: a second check module, configured to check the validity and integrity of the crash information via checking whether the second data checking information at browser side is correct or not.

17. The system according to claim 11 wherein the system further comprises:

a database;

a third cloud crash server, configured to transmit the analyzing result obtained through the analyzing device to an index server;

and the index server, configured to save the analyzing result of the crash data packet into the database in the manner of incremental indexing at a preset time interval.

18. A non-transitory computer readable medium having instructions stored thereon that, when executed by at least one processor, cause the at least one processor to perform operations for processing browser crash information, comprising:

receiving browser crash status information uploaded when a browser crashes;

according to the browser crash status information, generating crash identification information to indicate whether allowing the browser to upload a crash data packet or not;

feeding the crash identification information back to the browser;

if the crash identification information indicates allowing the browser to upload the crash data packet, receiving crash information including the crash data packet uploaded by the browser;

starting up an automatic crash data packet analyzing program to analyze the crash data packet; and sending the analyzing result of the crash data packet back to the browser uploading the crash data packet.

wherein the step of according to the browser crash status information, generating crash identification information to indicate whether allowing the browser to upload the crash data packet or not further comprises:

processing public parameters of browser crash included in the browser crash status information according to preset algorithm to generate crash key values;

obtaining the crash identification information according to the crash key values to indicate whether allowing the browser to upload the crash data packet or not.

* * * * *